(12) United States Patent
Terry

(10) Patent No.: US 7,584,397 B2
(45) Date of Patent: Sep. 1, 2009

(54) METHOD AND APPARATUS FOR DYNAMICALLY ADJUSTING DATA TRANSMISSION PARAMETERS AND CONTROLLING H-ARQ PROCESSES

(75) Inventor: Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1047 days.

(21) Appl. No.: 11/140,034

(22) Filed: May 27, 2005

(65) Prior Publication Data

US 2005/0276266 A1    Dec. 15, 2005

Related U.S. Application Data

(60) Provisional application No. 60/578,728, filed on Jun. 10, 2004.

(51) Int. Cl.
*H04L 1/18* (2006.01)
*G08C 25/02* (2006.01)

(52) U.S. Cl. .................................... 714/748
(58) Field of Classification Search ............ 714/18, 714/748–751; 455/450, 522; 370/394
See application file for complete search history.

(56) References Cited

U.S. PATENT DOCUMENTS

| | | | |
|---|---|---|---|
| 5,490,168 | A | 2/1996 | Phillips et al. |
| 6,671,284 | B1 | 12/2003 | Yonge, III et al. |
| 6,731,623 | B2 | 5/2004 | Lee et al. |
| 6,747,967 | B2 | 6/2004 | Marinier |
| 6,950,655 | B2 | 9/2005 | Hunkeler |
| 6,987,981 | B2 | 1/2006 | Kuo |
| 7,054,316 | B2 | 5/2006 | Cheng et al. |
| 7,124,350 | B2 | 10/2006 | Chao et al. |

(Continued)

FOREIGN PATENT DOCUMENTS

EP        0 951 198        10/1999

(Continued)

OTHER PUBLICATIONS

Rosa et al., Performance of fast node B scheduling and L1 HARQ schemes in WDCMA uplink packet access, 2004, IEEE, p. 1635-1639.*

(Continued)

*Primary Examiner*—Shelly A Chase
(74) *Attorney, Agent, or Firm*—Volpe and Koenig, P.C.

(57) ABSTRACT

In a wireless communication system including a wireless transmit/receive unit (WTRU) which transfers data to a Node-B, data transmission parameters such as modulation and coding scheme (MCS) and transport block set (TBS) size are dynamically adjusted on a transmission time interval (TTI) basis, and hybrid-automatic repeat request (H-ARQ) processes used to control the transfer of data between the WTRU and the Node-B are initiated and released, as required. The WTRU transmits and retransmits data to the Node-B through an enhanced uplink (EU) dedicated channel (E-DCH) in accordance with data feedback information received from the Node-B. The WTRU queues data for transmission, and determines a transmission status of the data. The transmission status is set to one of "new transmission," "successful transmission," "retransmission" and "restarted transmission." For each TTI, the WTRU initiates an EU transmission to the Node-B which identifies the assigned H-ARQ process, TBS size and MCS.

23 Claims, 4 Drawing Sheets

U.S. PATENT DOCUMENTS

| | | | |
|---|---|---|---|
| 7,298,713 | B2 | 11/2007 | Goldberg et al. |
| 2002/0001296 | A1 | 1/2002 | Lee et al. |
| 2004/0100918 | A1 | 5/2004 | Toskala et al. |

FOREIGN PATENT DOCUMENTS

| | | |
|---|---|---|
| RU | 2005120874 | 1/2007 |
| RU | 2006126636 | 1/2008 |
| WO | 00/49760 | 8/2000 |
| WO | 01/31854 | 3/2001 |
| WO | 03/03643 | 1/2003 |
| WO | 03/069818 | 8/2003 |

OTHER PUBLICATIONS

3GPP, "3$^{rd}$ Generation Partnership Project; Technical Specification Group Radio Access Network; FDD Enhanced Uplink; Overall Description; Stage 2 (Release 6)," 3GPP TS 25.309 V6.2.0, (Mar. 2005).

3GPP, "3$^{rd}$ Generation Partnership Project; Technical Specification Group Radio Access Network; Medium Access Control (MAC) Protocol Specification (Release 1999)," 3GPP TS 25.321 V3.16.0, (Sep. 2003).

3GPP, "3$^{rd}$ Generation Partnership Project; Technical Specification Group Radio Access Network; Medium Access Control (MAC) Protocol Specification (Release 1999)," 3GPP TS 25.321 V3.17.0, (Jun. 2004).

3GPP, "3$^{rd}$ Generation Partnership Project; Technical Specification Group Radio Access Network; Medium Access Control (MAC) Protocol Specification (Release 5)," 3GPP TS 25.321 V5.10.0, (Dec. 2004).

3GPP, "3$^{rd}$ Generation Partnership Project; Technical Specification Group Radio Access Network; Medium Access Control (MAC) Protocol Specification (Release 5)," 3GPP TS 25.321 V5.8.0, (Mar. 2004).

3GPP, "3$^{rd}$ Generation Partnership Project; Technical Specification Group Radio Access Network; Medium Access Control (MAC) Protocol Specification (Release 4)," 3GPP TS 25.321 V4.10.0, (Jun. 2004).

3GPP, "3$^{rd}$ Generation Partnership Project; Technical Specification Group Radio Access Network; Medium Access Control (MAC), Protocol Specification (Release 4)," 3GPP TS 25.321 V4.9.0, (Sep. 2003).

3GPP2 C.20003-C, "Medium Access Control (MAC) Standard for cdma2000 Spread Spectrum Systems", 3$^{rd}$ Generation Partnership Project 2 "3GPP2", Version 2.0, Release C, Aug. 2004.

3GPP2 C.S0002-C, "Physical Layer Standard for cdma2000 Spread Spectrum Systems", 3$^{rd}$ Generation Partnership Project 2 "3GPP2", Version 2.0, Revision C, Jul. 23, 2004.

3GPP2 C.S0004-C, "Signaling Link Access Control (LAC) Standard for cdma2000 Spread Spectrum Systems", 3$^{rd}$ Generation Partnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", 3$^{rd}$ Generation Partnership Project 2 "3GPP2", Version 2.0, Revision c, Jul. 23, 2004.

Ghosh et al., "Overview of Enhanced Uplink for 3GPP W-CDMA," 2004 IEEE 59th Vehicular Technology Conference, VTC 2004-Spring, (May 17-19, 2004).

Yoon et al., "Throughput Bound of CDMA Unslotted ALOHA with Hybrid Type II ARQ using Rate Compatible Punctured Turbo Codes," IEEE Global Telecommunications Conference, vol. 4, (Dec. 1-5, 2003).

3GPP2 C.S0002-C, "Physical Layer Standard for cdma2000 Spread Spectrum Systems", 3$^{rd}$ Generation Partnership Project 2 "3GPP2", Version 2.0, Revision C, Jul. 23, 2004.

3GPP2 C.20003-C, "Medium Access Control (MAC) Standard for cdma2000 Spread Spectrum Systems", 3$^{rd}$ Generation Partnership Project 2 "3GPP2", Version 2.0, Release C, Aug. 2004.

3GPP2 C.S0004-C, "Signaling Link Access Control (LAC) Standard for cdma2000 Spread Spectrum Systems", 3$^{rd}$ Generation Partnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", 3$^{rd}$ Generation Partnership Project 2 "3GPP2", Version 2.0, Revision c, Jul. 23, 2004.

\* cited by examiner

INCREMENTAL
REDUNDANCY
(IR)

- 402 NEXT TTI
- 404 HAVE EU PHYSICAL RESOURCES BEEN ASSIGNED BY THE NODE-B FOR TRANSMISSION OF DATA? — NO → back to 402
- YES → 406 IS THE DATA NEW?
  - NO → 415 DOES THE WTRU UTILIZE A LIFESPAN TIMER?
    - NO → 420
    - YES → 416 HAS THE LIFESPAN TIMER EXPIRED?
      - YES → 418 THE WTRU DISCARDS THE DATA AND RELEASES THE H-ARQ PROCESS.
      - NO → 420 IS THE RETRANSMISSION COUNT LESS THAN THE MAXIMUM NUMBER OF ALLOWED RETRANSMISSIONS?
        - YES → 422 THE WTRU INCREMENTS THE TRANSMISSION COUNTER AND SELECTS A MORE ROBUST MCS (IF ALLOWED). → 424 THE WTRU USES THE SAME H-ARQ PROCESS, TBS/TFC AND NDI.
        - NO → 425 ARE RESTARTED TRANSMISSIONS ALLOWED? (OPTIONAL)
          - NO → 418
          - YES → 426 THE WTRU INITIALIZES THE RETRANSMISSION COUNTER, INCREMENTS THE NDI AND ASSIGNS A NEW H-ARQ PROCESS. → 428 THE WTRU USES THE SAME TBS/TFC AND SELECTS THE MCS.
  - YES → 408 THE WTRU SELECTS THE HIGHEST PRIORITY DATA TO TRANSMIT. → 410 THE WTRU SELECTS THE MAXIMUM TRANSPORT BLOCK SET (TBS) SIZE AND CORRESPONDING TRANSPORT FORMAT COMBINATION (TFC) USING THE MOST ROBUST MODULATION AND CODING SCHEME (MCS) ALLOWED. → 412 THE WTRU GENERATES MAC-e PDU(s) BASED ON THE SELECTED TBS SIZE AND ASSIGNS AN H-ARQ PROCESS FOR TRANSMISSION OF THE MAC-e PDU(s). → 414 THE WTRU INITIALIZES A RETRANSMISSION COUNTER, INCREMENTS A NEW DATA INDICATOR (NDI) AND OPTIONALLY SETS A LIFESPAN TIMER.
- 430 THE WTRU INITIATES AN EU TRANSMISSION TO THE NODE-B WHICH IDENTIFIES THE CURRENT H-ARQ PROCESS, TBS SIZE AND MCS.

METHOD AND APPARATUS FOR DYNAMICALLY ADJUSTING DATA TRANSMISSION PARAMETERS AND CONTROLLING H-ARQ PROCESSES

CROSS REFERENCE TO RELATED APPLICATION

This application claims the benefit of U.S. Provisional Application No. 60/578,728 filed Jun. 10, 2004, which is incorporated by reference as if fully set forth.

FIELD OF INVENTION

The present invention is related to a wireless communication system including a wireless transmit/receive unit (WTRU) and a Node-B. More particularly, the present invention is related to a method and apparatus for dynamically adjusting data transmission parameters such as modulation and coding scheme (MCS) and transport block set (TBS) size, and assigning and releasing a hybrid-automatic repeat request (H-ARQ) process used to control the transfer of data between the WTRU and the Node-B.

BACKGROUND

In 3rd generation cellular systems, adaptive modulation and coding (AM&C) and H-ARQ schemes are being investigated for incorporation into an enhanced uplink (EU) operation designed to offer low transmission latency, higher throughput, and more efficient use of physical resources.

The AM&C scheme allows an MCS to be dynamically adjusted on a transmit time interval (TTI) basis whereby, for each TTI, the MCS is selected to make the most efficient use of radio resources and to provide the highest possible data rates. A less robust MCS uses less physical resources, but is more vulnerable to errors. A more robust MCS uses more physical resources, but offers greater protection against errors.

The H-ARQ scheme is used to generate transmissions and retransmissions with low latency. A primary aspect of the H-ARQ scheme is that data received in failed transmissions can be soft combined with successive retransmissions to increase the probability of successful reception. Either Chase Combining (CC) or incremental redundancy (IR) may be applied. When CC is applied, the same MCS is chosen for the retransmission. When IR is applied, a more robust MCS is used in each retransmission.

SUMMARY

The present invention is implemented in a wireless communication system including a WTRU which transfers data to a Node-B. Data transmission parameters such as TBS size are dynamically adjusted on a TTI basis. Optionally, MCS may also be adjusted. An H-ARQ process used to control the transfer of data between the WTRU and the Node-B is assigned and released, as required. The WTRU transmits and retransmits data to the Node-B through an enhanced uplink (EU) dedicated channel (E-DCH) in accordance with feedback information received from the Node-B. The WTRU queues data for transmission, and determines a transmission status of the data. The transmission status is set by a controller in the WTRU to one of "new transmission," "successful transmission," "retransmission" and "restarted transmission." For each TTI, the WTRU initiates an EU transmission to the Node-B which identifies either explicitly or implicitly the retransmission number, new data indication, assigned H-ARQ process, TBS size and optionally MCS.

The transmission status of data is set by the controller in the WTRU to "new transmission" when the data is new data, to "successful transmission" when an acknowledge (ACK) message is received from the Node-B, to "retransmission" when a non-acknowledge (NACK) message or no response is received from the Node-B in response to the transmission of the new data, and optionally to "restarted transmission" when a retransmission count exceeds a predetermined maximum number of retransmissions.

If the transmission status is "new transmission", an initial H-ARQ process is assigned. If the transmission status is "retransmission", the same H-ARQ process is assigned while incrementing the retransmission counter. If the transmission status is "successful transmission", the H-ARQ process is released. If the transmission status is "restarted transmission", which is optional, an H-ARQ process is assigned while initializing the retransmission counter and incrementing a new data indicator (NDI).

BRIEF DESCRIPTION OF THE DRAWINGS

A more detailed understanding of the invention may be had from the following description of a preferred example, given by way of example and to be understood in conjunction with the accompanying drawing wherein:

FIG. 4 is a flow diagram of a process including method steps for implementing IR in accordance with the present invention.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
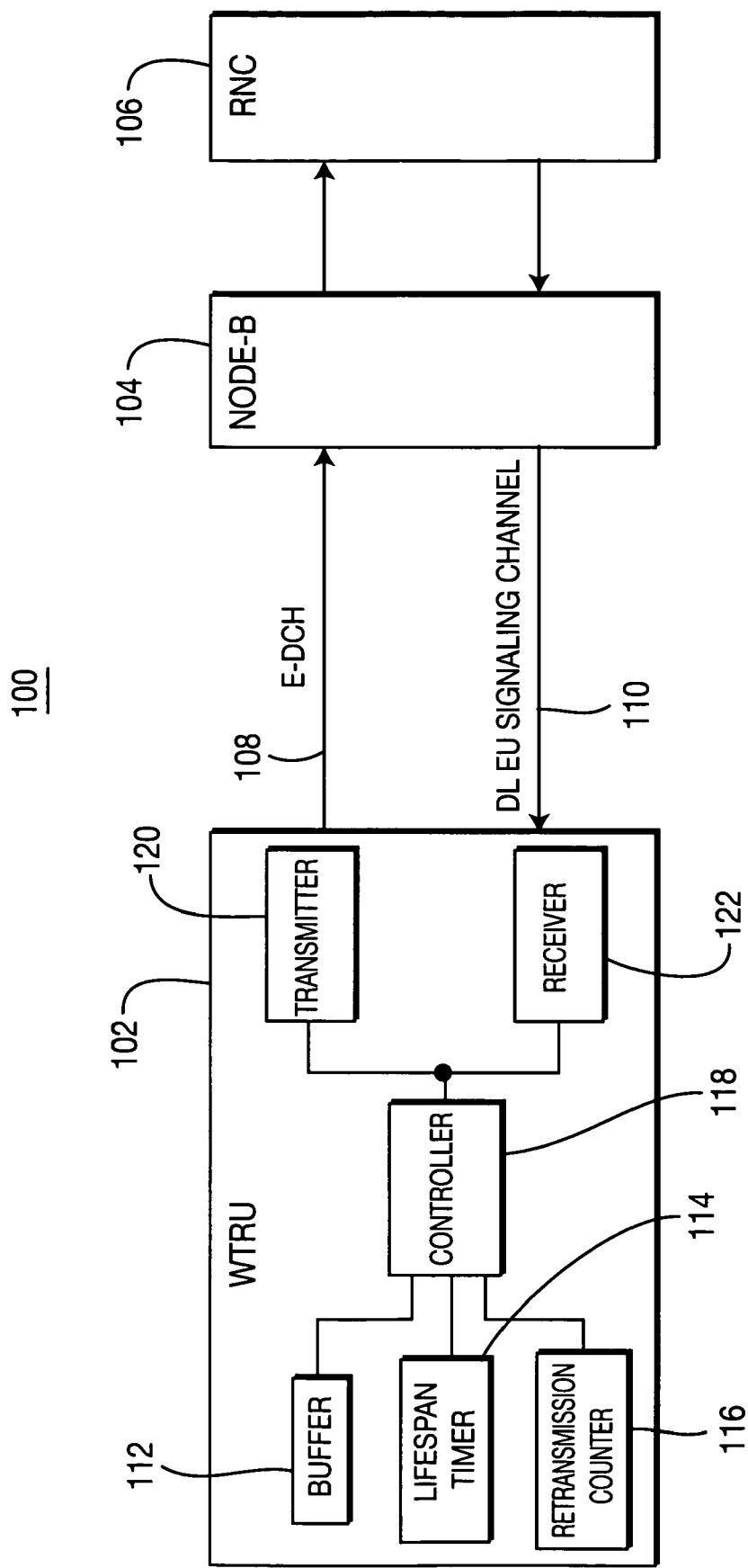
FIG. 1 is a block diagram of a wireless communication system operating in accordance with the present invention.

FIG. 1 is a block diagram of a wireless communication system 100 operating in accordance with the present invention. The system 100 comprises a WTRU 102, a Node-B 104, and a radio network controller (RNC) 106. The WTRU 102 transmits data through an E-DCH 108 with a transmitter 120 and receives feedback with a receiver 122 from the Node-B 104 through a downlink (DL) signaling channel 110 based on an initiated H-ARQ process. When the Node-B 104 fails to decode the data sent by the WTRU 102, the Node-B 104 transmits a NACK message to the WTRU 102 via the DL signaling channel 110 or does not transmit feedback which is interpreted as a NACK by the WTRU 102. When the Node-B 104 succeeds to decode the data sent by the WTRU 102, the Node-B 104 transmits an ACK message to the WTRU 102 which releases the H-ARQ process for other transmissions. The H-ARQ processes may either be designed to implement CC or IR. The RNC 106 controls overall operation of data transfers that occur between the Node-B 104 and the WTRU 102, including radio resources allocation. The WTRU 102 includes a data buffer 112 for storing E-DCH data, an optional data lifespan timer 114 used to determine whether it is necessary to discard expired data, and a retransmission counter 116 used to determine whether data transmitted by the WTRU 102 but not received by the Node-B 104 should be retransmitted or whether H-ARQ transmission should be terminated or optionally restarted. The buffer 112, the lifespan timer 114 and the retransmission counter 116 are controlled by a controller 118. The controller 118 sets, (i.e., keeps track of), the status of each transmission associated with an H-ARQ process.

Figure 2:
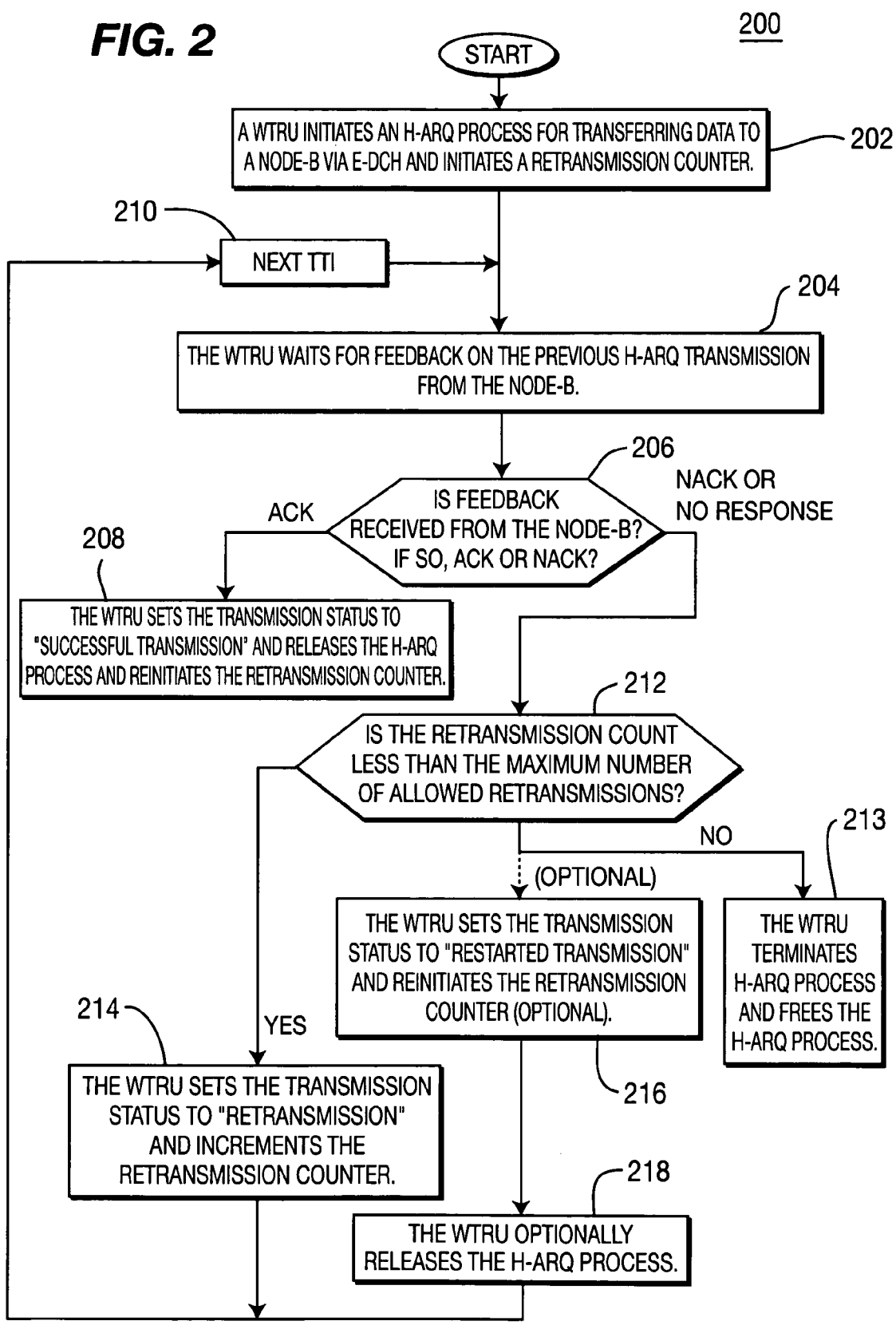
FIG. 2 is a flow diagram of a process for initiating and releasing H-ARQ processes in accordance with the present invention.

FIG. 2 is a flow diagram of a process 200 including method steps for controlling an H-ARQ process in accordance with the present invention. The H-ARQ process may be either synchronous or asynchronous. In a synchronous H-ARQ operation, the WTRU 102 keeps track of when responses to data transmissions between the WTRU 102 and the Node-B 104 are expected, and the periodicity of H-ARQ retransmissions is predetermined. In an asynchronous H-ARQ operation, the WTRU 102 transmits data and waits for the feedback for a predetermined period of time.

After the WTRU 102 initiates the H-ARQ process and the retransmission counter 116, the WTRU 102 transmits data to the Node-B 104 via the E-DCH 108 during a current TTI (step 202). In step 204, the WTRU 102 waits for feedback from the Node-B 104. If the WTRU 102 receives an ACK message from the Node-B 104, the WTRU 102 then sets the transmission status to "successful transmission", releases the H-ARQ process and reinitiates the retransmission counter 116 (step 208) for subsequent data transmissions.

If, at step 206, the WTRU 102 receives a NACK message or did not receive any response, the WTRU 102 determines whether the retransmission count indicated by the retransmission counter 116 is less than or equal to the maximum number of allowed retransmissions (step 212).

If the retransmission count as determined at step 212 is less than the maximum number of allowed retransmissions, the WTRU 102 sets, or maintains, the transmission status to "retransmission" and increments the retransmission counter 116 (step 214). The retransmission counter 116 is incremented each time the same data is retransmitted by the WTRU 102.

If the retransmission count as determined at step 212 is equal to or greater than the maximum number of allowed retransmissions, the H-ARQ process transmission is terminated and reset for supporting subsequent data transmissions (step 213). Optionally the WTRU 102 may set the transmission status to "restarted transmission" and reinitiates the retransmission counter (step 216). After setting the transmission status to "restarted transmission", the WTRU 102 reinitiates the H-ARQ transmission process as a "new transmission" or the WTRU 102 may optionally release the H-ARQ process (step 218).

Figure 3:
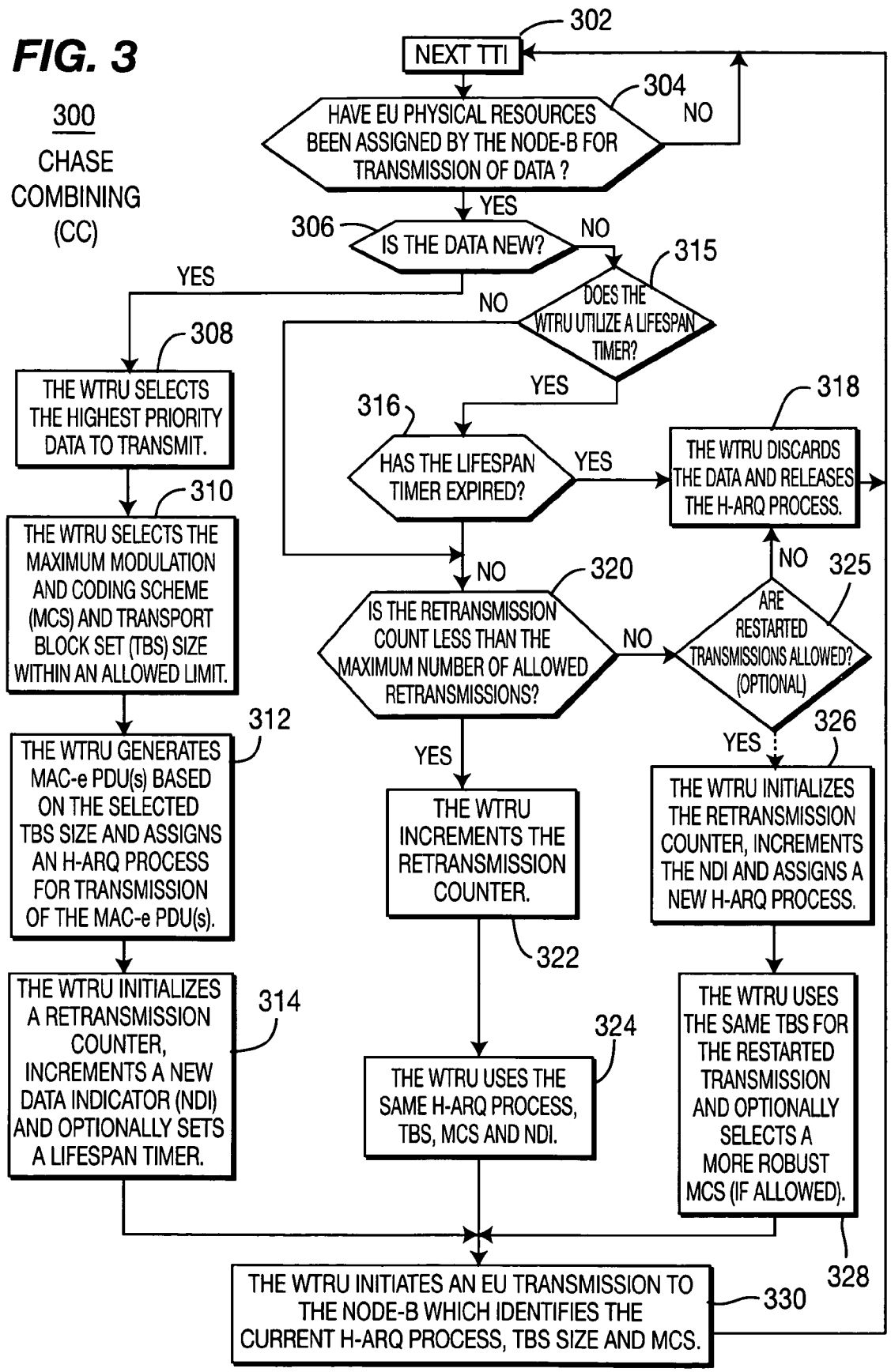
FIG. 3 is a flow diagram of a process including method steps for implementing CC in accordance with the present invention.

FIG. 3 is a flow diagram of a process 300 including method steps for implementing CC in accordance with the present invention. The process 300 is performed on a TTI basis (step 302). In step 304, the WTRU 102 determines whether EU physical resources have been assigned by the Node-B 104 and whether an H-ARQ process is available for the WTRU 102 to transmit data to the Node-B 104 via the E-DCH 108. If EU physical resources have not been assigned, the WTRU 102 waits for the allocation of EU physical resources and the transmission of data is delayed until the next TTI (step 302). If EU physical resources have been allocated and an H-ARQ process is available, the WTRU 102 determines whether the data is new data (step 306). If the data is determined to be new data in step 306, the WTRU 102 selects the highest priority data to transmit (step 308). Additionally, the WTRU 102 selects the MCS and TBS size that maximizes transmission of the highest priority data within an allowed limit (step 310). TBS size is chosen based on the Node-B 104 signaled maximum MCS and TBS size, transmit power available for the E-DCH 108, MCS, and the data available in the buffer 112 for transmission.

For each transport channel (TrCH), dedicated channel medium access control (MAC-d) flow or logical channel, a list of allowed TBS sizes, a retransmission limit and allowed transmission latency, (i.e., MAC data "lifespan"), are determined. The allowable MCS and TBS sizes are the maximum that the WTRU 102 is allowed to transmit for the current physical resources allocation period. The configuration is either signaled from the RNC 106 in accordance with radio resource control (RRC) procedures or uniquely specified by a standard. The chosen MCS and TBS size may be either explicitly signaled (preferably from the Node-B) or derived from an associated parameter such as a channel quality indicator (CQI) and/or transport format combination (TFC) index. The CQI may represent the maximum allowed WTRU interference or transmit power. The Node-B 104 may signal this information in the initial channel assignment. Alternatively, the Node-B 104 may send this information when the WTRU 102 requests additional EU channel allocations.

In step 312, the WTRU 102 then generates at least one EU MAC (MAC-e) protocol data unit (PDU) based on the selected TBS size, and assigns an H-ARQ process for transmission of the MAC-e PDU. In step 314, the WTRU 102 initializes the retransmission counter 116, increments an NDI and optionally sets the lifespan timer 114 in the WTRU 102. The NDI is used to indicate when new data is being transmitted and when the Node-B 104 needs to clear the soft buffer associated with the H-ARQ process that is being transmitted. The initial value of the retransmission counter 116 may be interpreted as a transmission of new data and, in such a case, the NDI parameter is not needed. The WTRU 102 then initiates an EU transmission to the Node-B 104 identifying the current H-ARQ process, TBS size, (if not assigned by the Node-B 104), and MCS. The H-ARQ process and MCS may be implicitly known by the Node-B 104 due to a specified H-ARQ process operation, and thus may not need to be signaled by the WTRU 102 to the Node-B 104.

When CC is supported, the TBS size information is identified to the Node-B 104 for each transmission and retransmission, unless TBS is identified by the Node-B 104 in the physical channel allocation. Retransmissions have the same MCS and TBS as applied in the initial transmission in the case of CC.

Referring back to step 306, if it is determined that the data is not new data, a determination is made as to whether the WTRU 102 utilizes the lifespan timer 114 (step 315). If the WTRU 102 utilizes the lifespan timer 114, the process 300 proceeds to step 316 to determine whether the lifespan timer 114 has expired. If the lifespan timer 114 has expired, the WTRU 102 discards the data and releases, (i.e., frees), the H-ARQ process (step 318), and the process 300 returns to step 302. Optionally, when the lifespan timer 114 is close to expiration, the WTRU 102 may use a more robust MCS to increase the probability of successful transmission.

The retransmission counter 116 in the WTRU 102 is incremented each time a data transmission is not successful and thus not acknowledged by the Node-B 104. If the lifespan timer 114 has not yet expired, or if the WTRU 102 does not utilize the lifespan timer 114, the process 300 proceeds to step 320 for retransmission of the data whereby the WTRU 102 determines whether the retransmission count is less than the maximum number of allowed retransmissions. If the retransmission count is less than the maximum number of allowed retransmissions, the status of transmission is set to or maintained as "retransmission," the WTRU 102 increments the retransmission counter 116 (step 322) and uses the same H-ARQ process, TBS, MCS and NDI, (if not incorporated with the retransmission counter) (step 324). The WTRU 102 then initiates an EU transmission to the Node-B 104 identifying the H-ARQ process, (this may be implicitly known and may not need be signaled to the Node-B), TBS size (if not assigned by the Node-B), and MCS in the associated physical control channel (step 330).

If the retransmission count reaches or exceeds the maximum number of allowed retransmissions, the process 300 proceeds to step 318 to discard the data and release the H-ARQ process. Alternatively, if restarted transmissions are determined to be allowed in optional step 325, the status of transmission is set to "restarted transmission," and the WTRU 102 initializes the retransmission counter 116, increments the NDI and assigns a new H-ARQ process (step 326). If the previously transmitted data stored in the soft combining buffer is disrupting successive retransmissions, it is better to clear the soft buffer and restart the H-ARQ transmission to increase the probability of successful transmission. Therefore, when the maximum number of retransmissions for a particular H-ARQ process is reached, the NDI, (or an initialized retransmission count), is sent to indicate that the H-ARQ transmissions have been restarted. When the Node-B 104 receives the incremented NDI, (or the transmission count set to the initial value), the Node-B 104 clears the soft combining buffer of the previously received data.

In step 328, a new H-ARQ transmission is initiated using the same TBS and, optionally, a more robust MCS may be selected for the "new transmission" to increase the probability of successful delivery (step 328). In order to allow this change in MCS, the TBS may be segmented into several independent transmissions. In the case a transmission is being reinitiated with more redundancy (either by change of MCS or just less puncturing) the previous TBS may no longer fit in the allocated physical resource. In this case the original transmission may be segmented into multiple separate transmissions that do not exceed the requirement. The WTRU 102 then initiates an EU transmission to the Node-B which identifies the current H-ARQ process, (may be implicitly known to the Node-B), TBS size and MCS, (if not assigned by the Node-B), in the associated physical control channel (step 330).

FIG. 4 is a flow diagram of a process 400 including method steps for implementing IR in accordance with the present invention. The process 400 is performed on a TTI basis (step 402). In step 404, the WTRU 102 determines whether EU physical resources have been assigned by the Node-B 104 and whether an H-ARQ process is available for the WTRU 102 to transmit data to the Node-B 104 via the E-DCH 108 (step 404). If EU physical resources have not been assigned, the WTRU 102 waits for the allocation of EU physical resources and the transmission of data is delayed until the next TTI (step 402). If EU physical resources have been allocated and an H-ARQ process is available, the WTRU 102 determines whether the data is new data (step 406). If the data is determined to be new data in step 406, the WTRU 102 selects the highest priority data to transmit (step 408). Additionally, the WTRU 102 selects the maximum TBS size and corresponding TFC maximizing transmission of the highest priority data using the most robust MCS allowed (step 410).

In step 412, the WTRU 102 then generates at least one MAC-e PDU based on the selected TBS size, and assigns an H-ARQ process for transmission of the MAC-e PDU. In step 414, the WTRU 102 initializes the retransmission counter 116, increments an NDI and optionally sets the lifespan timer 114 in the WTRU 102 (step 414). The NDI is used to indicate when new data is being transmitted and when the Node-B 104 needs to clear the soft buffer associated with the H-ARQ process that is being transmitted. The initial value of the retransmission counter 116 may be interpreted as a transmission of new data and, in such a case, the NDI parameter is not needed. The WTRU 102 then initiates EU transmission to the Node-B 104 identifying the current H-ARQ process, TBS size and MCS in the associated physical control channel (step 430). The H-ARQ process and MCS may be implicitly known by the Node-B 104 due to a specified H-ARQ process operation, and thus may not need to be signaled by the WTRU 102 to the Node-B 104.

Referring back to step 406, if it is determined that the data is not new data, a determination is made as to whether the WTRU 102 utilizes the lifespan timer 114 (step 415). If the WTRU 102 utilizes the lifespan timer 114, the process 400 proceeds to step 416 to determine whether the lifespan timer 114 has expired. If the lifespan timer 114 has expired, the WTRU 102 discards the data and releases, (i.e., frees), the H-ARQ process (step 418), and the process 400 returns to step 402. Optionally, when the lifespan timer 114 is close to expiration, the WTRU 102 may use a more robust MCS to increase the probability of successful transmission.

The retransmission counter 116 in the WTRU 102 is incremented each time a data transmission is not successful and thus not acknowledged by the Node-B 104. If the lifespan timer 114 has not yet expired, or if the WTRU 102 does not utilize the lifespan timer 114, the process 400 proceeds to step 420 for retransmission of the data whereby the WTRU 102 determines whether the retransmission count is less than the maximum number of allowed retransmissions. If the retransmission count is less than the maximum number of allowed retransmissions, the status of transmission is set to or maintained as "retransmission," and the WTRU 102 increments the retransmission counter 116 and selects a more robust MCS, if allowed (step 422). In step 424, the WTRU 102 uses the same H-ARQ process, TBS/TFC and NDI.

For IR, determination of the MCS and TBS size takes into account support of the most robust MCS, what is required by the data which is ready to transmit in the WTRU 102, and available WTRU transmit power. With each retransmission, a more robust MCS may be chosen for the same TBS. The initial transmissions with less robust MCS allow for a larger TBS size, but this size is restricted so that the same TBS can still be supported by the most robust MCS. Also, for determination of the TBS, the WTRU available transmit power for EU must be taken into account the most robust MCS allowed, even though the most robust MCS may not be required for successful transmission.

If the retransmission count reaches or exceeds the maximum, the process 400 proceeds to step 418 to discard the data and release the H-ARQ process. Alternatively, if restarted transmissions are determined to be allowed in step 425, the status of transmission is set to "restarted transmission," and the WTRU 102 initializes the retransmission counter 116, increments the NDI and assigns a new H-ARQ process (step 426). In step 428, the same TBS/TFC is used and an MCS is selected.

Although the features and elements of the present invention are described in the preferred embodiments in particular combinations, each feature or element can be used alone without the other features and elements of the preferred embodiments or in various combinations with or without other features and elements of the present invention.

While the present invention has been described in terms of the preferred embodiment, other variations which are within the scope of the invention as outlined in the claims below will be apparent to those skilled in the art.

What is claimed is:

1. A method of dynamically adjusting data transmission parameters for transmission of enhanced dedicated channel (E-DCH) data, the method comprising:
   queuing E-DCH data in a buffer;
   selecting E-DCH data from the buffer available for transmission;
   determining whether or not the selected E-DCH data was previously transmitted;
   if it is determined that the selected E-DCH data was not previously transmitted selecting a modulation and coding scheme (MCS) within an allowed limit;
   assigning a hybrid automatic repeat request (H-ARQ) process;
   generating at least one enhanced uplink medium access control (MAC-e) protocol data unit (PDU); and
   initiating an enhanced uplink transmission which identifies the H-ARQ process and the MCS.

2. A method of dynamically adjusting data transmission parameters for transmission of enhanced dedicated channel (E-DCH) data, the method comprising:
   queuing E-DCH data in a buffer;
   selecting E-DCH data from the buffer available for transmission;
   determining whether or not the selected E-DCH data was previously transmitted;
   if it is determined that the selected E-DCH data was not previously transmitted selecting a transport block set (TBS) size within an allowed limit;
   assigning a hybrid automatic repeat request (H-ARQ) process;
   generating at least one enhanced uplink medium access control (MAC-e) protocol data unit (PDU); and
   initiating an enhanced uplink transmission which identifies the H-ARQ process and the TBS size.

3. A method of dynamically adjusting data transmission parameters for transmission of enhanced dedicated channel (E-DCH) data, the method comprising:
   queuing E-DCH data in a buffer;
   selecting E-DCH data for transmission;
   determining whether or not the selected E-DCH data is new data; and
   if the data is new data,
      selecting a data transmission parameter within an allowed limit;
      assigning a hybrid automatic repeat request (H-ARQ) process for transmission of the data;
      transmitting the data identifying the data transmission parameter; and
      initializing a transmission count.

4. The method of claim 3 wherein the data transmission parameter is modulation and coding scheme.

5. The method of claim 3 wherein the data transmission parameter is a transport block set size.

6. The method of claim 3 further comprising:
   if it is determined that the selected data is not new data,
      determining whether a retransmission count of the selected data is less than a maximum number of allowed retransmissions; and
      if the retransmission count is less than the maximum, retransmitting the data and incrementing the retransmission count.

7. The method of claim 6 further comprising:
   if the retransmission count is not less than the maximum, discarding the data and releasing the H-ARQ process.

8. The method of claim 6 further comprising:
   if the retransmission count is not less than the maximum, restarting the H-ARQ process transmission while initializing the retransmission count.

9. The method of claim 8 wherein a new data indicator is transmitted to indicate a restart of the transmission.

10. The method of claim 3 further comprising:
    if the data is not new data, determining whether a lifespan timer for the selected data has expired, whereby the selected data is discarded when the lifespan timer expires.

11. A wireless transmit/receive unit (WTRU) for dynamically adjusting data transmission parameters for transmission of enhanced dedicated channel (E-DCH) data, the WTRU comprising:
    a buffer for queuing E-DCH data;
    a retransmission counter for tracking number of transmissions of same data block;
    a transmitter and a receiver for transmitting and receiving the E-DCH data; and
    a controller for selecting data and transmission parameters for transmission of the E-DCH data and assigning a hybrid automatic repeat request (H-ARQ) process for transmission of the data,
    whereby if the data is new data the controller selects a data transmission parameter within an allowed limit and initializes a retransmission count.

12. The WTRU of claim 11 wherein the data transmission parameter is modulation and coding scheme.

13. The WTRU of claim 12 wherein the data transmission parameter is a transport block set size.

14. The WTRU of claim 12 wherein if the selected data for transmission is not new data, the controller determining whether the retransmission count of the selected data is less than a maximum number of allowed retransmissions, and if the retransmission count is less than the maximum, the controller retransmits the data incrementing the retransmission count.

15. The WTRU of claim 14 wherein same transmission parameter is used for the retransmission.

16. The WTRU of claim 14 wherein more robust modulation and coding scheme is used for the retransmission.

17. The WTRU of claim 16 wherein a transport block is segmented into two or more transport blocks.

18. The WTRU of claim 14 wherein if the retransmission count is not less than the maximum, the data is discarded and associated H-ARQ process is released.

19. The WTRU of claim 14 wherein if the retransmission count is not less than the maximum, the controller restarts the H-ARQ process transmission while initializing the retransmission count.

20. The WTRU of claim 19 wherein a new data indicator is transmitted to indicate a restart of the transmission.

21. The WTRU of claim 19 wherein same data transmission parameters are used for the restarted transmission.

22. The WTRU of claim 19 wherein more robust modulation and coding scheme is used for the restarted transmission.

23. The WTRU of claim 11 further comprising:
    a life span timer for tracking life span of the data, whereby the controller discards the data when the lifespan timer expires.

* * * * *

UNITED STATES PATENT AND TRADEMARK OFFICE
CERTIFICATE OF CORRECTION

PATENT NO. : 7,584,397 B2
APPLICATION NO. : 11/140034
DATED : September 1, 2009
INVENTOR(S) : Stephen E. Terry It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1132 days.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,584,397 B2 | Page 1 of 1 |
| APPLICATION NO. | : 11/140034 | |
| DATED | : September 1, 2009 | |
| INVENTOR(S) | : Stephen E. Terry | |

It is certified that error appears in the above-identified patent and that said Letters Patent is hereby corrected as shown below:

ON THE TITLE PAGE

At Item (56), U.S. PATENT DOCUMENTS, page 2, left column, after line beginning with "2004/0100918" insert --2008/0137577 6/2008 Habetha--.

At Item (56), OTHER PUBLICATIONS, page 1, right column, on line beginning with "schemes in" after the words "schemes in" delete "WDCMA" and insert therefor --WCDMA--.

Signed and Sealed this
Tenth Day of May, 2011

David J. Kappos
*Director of the United States Patent and Trademark Office*